United States Patent
Choi

(10) Patent No.: US 7,038,986 B2
(45) Date of Patent: May 2, 2006

(54) METHOD AND APPARATUS FOR DISCRIMINATING BETWEEN DIFFERENT TYPES OF DISCS

(75) Inventor: Bong-hwoan Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 10/460,185

(22) Filed: Jun. 13, 2003

(65) Prior Publication Data
US 2004/0022156 A1 Feb. 5, 2004

(30) Foreign Application Priority Data
Aug. 8, 2002 (KR) ............... 2002-46806

(51) Int. Cl.
*G11B 5/09* (2006.01)
*G11B 7/00* (2006.01)

(52) U.S. Cl. .............. 369/53.23; 369/53.2; 369/47.55; 369/53.47; 369/44.27

(58) Field of Classification Search .................. None
See application file for complete search history.

(56) References Cited

U.S. PATENT DOCUMENTS

| 5,757,745 | A | * | 5/1998 | Takeya | 369/44.27 |
| 6,058,082 | A | * | 5/2000 | Hwang | 369/44.27 |
| 6,449,232 | B1 | * | 9/2002 | Kuwahara et al. | 369/53.23 |
| 2002/0181370 | A1 | * | 12/2002 | Yamanoi et al. | 369/53.22 |

* cited by examiner

*Primary Examiner*—Muhammad Edun
(74) *Attorney, Agent, or Firm*—Staas & Halsey LLP

(57) ABSTRACT

A disc discrimination method and apparatus include calculating a first time difference between a time when a first focusing signal is detected from a first recording area of a first disc and a time when a first reflection signal is detected from a first surface area of the first disc, and calculating a second time difference between a time when a second focusing signal is detected from a second recording area of a second disc and a time when a second reflection signal is detected from a second surface area of the second disc. An average value of the first and the second time differences is calculated and the average value obtained as a reference time is determined and a disc type of the first disc or the second disc loaded into the optical disc system is identified using the average value.

12 Claims, 3 Drawing Sheets

METHOD AND APPARATUS FOR DISCRIMINATING BETWEEN DIFFERENT TYPES OF DISCS

CROSS-REFERENCE TO RELATED APPLICATIONS

This application claims the benefit of Korean Application No. 2002-46806, filed Aug. 8, 2002, in the Korean Intellectual Property Office, the disclosure of which is incorporated herein by reference.

BACKGROUND OF THE INVENTION

1. Field of the Invention

The present invention relates to an optical disc system in which a compact disc (CD) and a digital video disc (DVD) can be compatibly used, and more particularly, to a method and apparatus for discriminating between a CD and a DVD by detecting a reflection signal from a surface area of the optical disc and a focusing signal from a recording area thereof.

2. Description of the Related Art

A digital video disc (DVD) is a more recently developed optical disc and is capable of recording more information than a conventional compact disc (CD). In comparison with the CD, the DVD has a higher recording density, and accordingly, a shorter distance between a surface area and a recording area. Practically, a distance between the surface area and the recording area of a DVD is 0.6 mm while that of a CD is 1.2 mm. Therefore, in order to perform adequate servo operations, an optical disc system must first determine whether an optical disc inserted therein is the CD or the DVD.

A conventional method for discriminating between the CD and the DVD will be described with reference to FIG. 1. When the optical disc is inserted, a reflection signal 110 is detected from the surface area of the optical disc, and a reflection signal detection time is stored. Thereafter, an S-curve signal 120 is detected from the recording area of the optical disc, and an S-curve signal detection time is stored. It is noted that the S-curve signal is a focusing signal generated by scanning an optical beam onto the recording area of the disc. Thereafter, a time difference between the reflection signal detection time and the S-curve signal detection time is calculated, and the calculated time difference is stored as a disc detection time 130. If the time difference between the reflection signal detection time and the S-curve signal detection time, i.e., the disc detection time 130, is above a predetermined reference time, the inserted disc is determined to be the CD, and if not, the DVD.

However, due to a difference in DC sensitivity of a pickup, a non-linear characteristic of an actuator, and, in the case of a special disc like a non-circular disc, a position and a direction of the optical disc placed in a tray, there may be a deviation in the disc detection time 130. Further, due to the difference in the DC sensitivity of the pickup and the non-linear characteristic of the actuator, the predetermined reference time used to discriminate between the CD and the DVD may be different from one optical disc system to another. Therefore, the conventional method occasionally causes an error in discriminating between the CD and the DVD.

SUMMARY OF THE INVENTION

According to an aspect of the present invention, there is provided a method and apparatus to discriminate between a CD and a DVD without a deviation in a disc detection time due to a difference in DC sensitivity of a pickup and a non-linear characteristic of an actuator.

A disc discrimination method, according to an aspect of the present invention, includes loading a first disc into an optical disc system and calculating a first time difference between a time when a first focusing signal is detected from a first recording area of the first disc and a time when a first reflection signal is detected from a first surface area of the first disc; loading a second disc into the optical disc system and calculating a second time difference between a time when a second focusing signal is detected from a second recording area of the second disc and a time when a second reflection signal is detected from a second surface area of the second disc; calculating an average value of the first and the second time differences; determining the average value obtained as a reference time; and identifying a disc type of the first disc or the second disc loaded into the optical disc system using the average value.

A disc discrimination apparatus having a lens and a pickup, according to an aspect of the present invention, includes an RF amplifier generating a reflection signal and a focusing signal in response to up and down motions of the lens of the pickup; and a system controller measuring times when the reflection signal and the focusing signal are detected with respect to different types of discs, calculating an average value of time differences between reflection signal detection times and focusing signal detection times measured with respect to the different types of discs, and determining the average value as a reference time to discriminate between the different types of discs.

According to an aspect of the present invention, there is provided a disc discrimination apparatus in a recording mode to determine a type of disc, including a system controller outputting a lens up/down instruction; a pickup; a digital signal processor (DSP) adding an error correction code (ECC) to encoded audio/video data and, in response to the lens up/down instruction from the system controller, providing a lens driving signal to the pickup; an RF amplifier converting an electrical signal from the DSP into an optical signal to be recorded onto the disc; and a servo receiving information from the DSP through the RF amplifier and the system controller to perform servo operations, wherein the system controller generates a reference time to discriminate between different types of discs based on a reflection signal detection time and an S-curve signal detection time.

According to an aspect of the present invention, there is provided a disc discrimination apparatus in a reproduction mode to determine a type of disc including a system controller outputting a lens up/down instruction; a pickup reading an optical signal from the disc on which data is recorded; an RF amplifier converting an optical signal from the DSP into an electrical signal, extracting servo signals and modulation data to perform servo operations, and detecting a reflection signal and an S-curve signal from the optical signal; a digital signal processor (DSP) demodulating the modulation data extracted through the RF amplifier, performing error correction while removing additive data, and providing a lens driving signal to the pickup in response to the lens up/down instruction from the system controller; and a servo receiving information from the DSP through the RF amplifier and the system controller to perform servo operations, wherein the system controller generates a reference time to discriminate between different types of discs based on a reflection signal detection time and an S-curve signal detection time.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects of the present invention, taken in conjunction with the accompanying drawings of which.

DETAILED DESCRIPTION OF THE INVENTION

Figure 1:
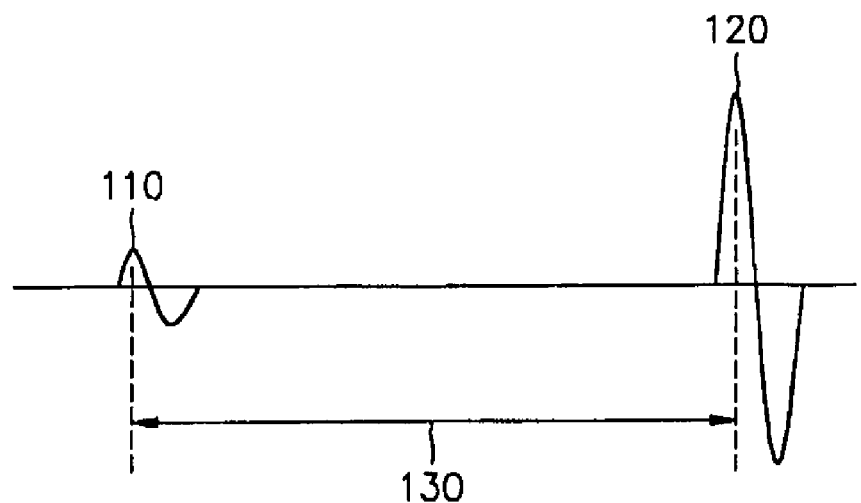
FIG. 1 is a schematic diagram illustrating a method to calculate a disc detection time.

Reference will now be made in detail to the aspects of the present invention, examples of which are illustrated in the accompanying drawings, wherein like reference numerals refer to like elements throughout. The aspects are described below in order to explain the present invention by referring to the figures.

Figure 2:
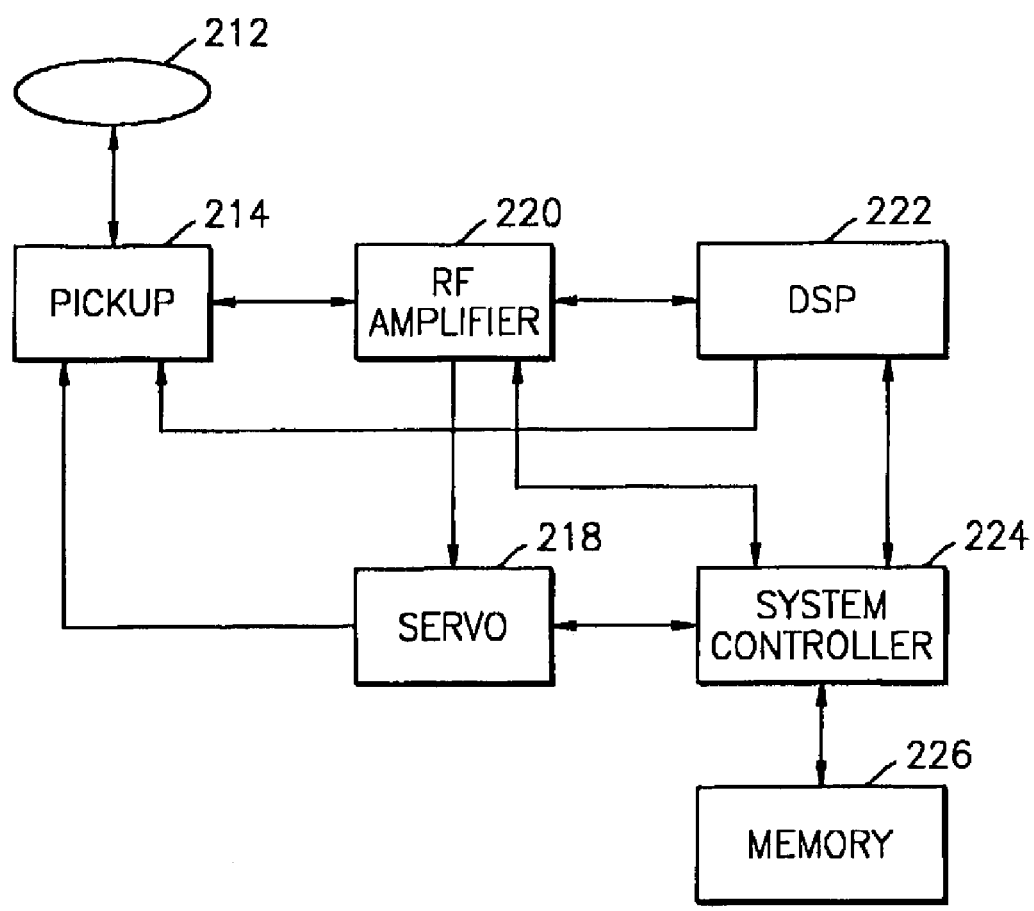
FIG. 2 is a block diagram of an optical disc system including a disc discrimination apparatus, according to an aspect of the present invention.

Referring to FIG. 2, there is shown an optical disc system including a disc discrimination apparatus, according to an aspect of the present invention. The detailed structure and operations of the optical disc system in a recording mode and in a reproducing mode will be described below with reference to FIG. 2.

In the recording mode, a digital signal processor (DSP) 222 adds an error correction code (ECC) to encoded audio/video data, and in response to a lens up/down instruction from a system controller 224, provides a lens driving signal to a pickup 214. An RF amplifier 220 converts an electrical signal provided from the DSP 222 into an optical signal. The pickup 214 includes an actuator (not shown) for focusing and tracking, and records the optical signal output from the RF amplifier 220 on a disc 212. A servo 218 receives information from the DSP 222 through the RF amplifier 220 and the system controller 224, and stably performs servo operations. The system controller 224 controls the overall system, and whenever information input by a user is received, records the data on the disc 212 through the DSP 222, the RF amplifier 220, and the pickup 214.

Meanwhile, in a reproducing mode, the pickup 214 reads an optical signal from the disc 212 on which the data is recorded. The RF amplifier 220 converts the optical signal provided from the pickup 214 into the electrical signal, extracts servo signals and modulation data to perform the servo operations, and detects a reflection signal and an S-curve signal from the optical signal provided from the pickup 214. The DSP 222 demodulates the modulation data extracted through the RF amplifier 220, and performs error correction using the ECC while removing additive data. In addition, the DSP 222 provides a lens driving signal to the pickup 214 in response to the lens up/down instruction from the system controller 224. The servo 218 receives the information for servo control from the RF amplifier 220 and the system controller 224, and stably performs the servo operations. The system controller 224 controls the pickup 214, the RF amplifier 220, and the DSP 222 in response to instructions provided by the user. Particularly, the system controller 224 generates a reference time to discriminate between the CD and the DVD based on a reflection signal detection time and an S-curve signal detection time. The memory 226 stores the reflection signal detection time and the S-curve signal detection time calculated by the system controller 224.

Figure 3A:
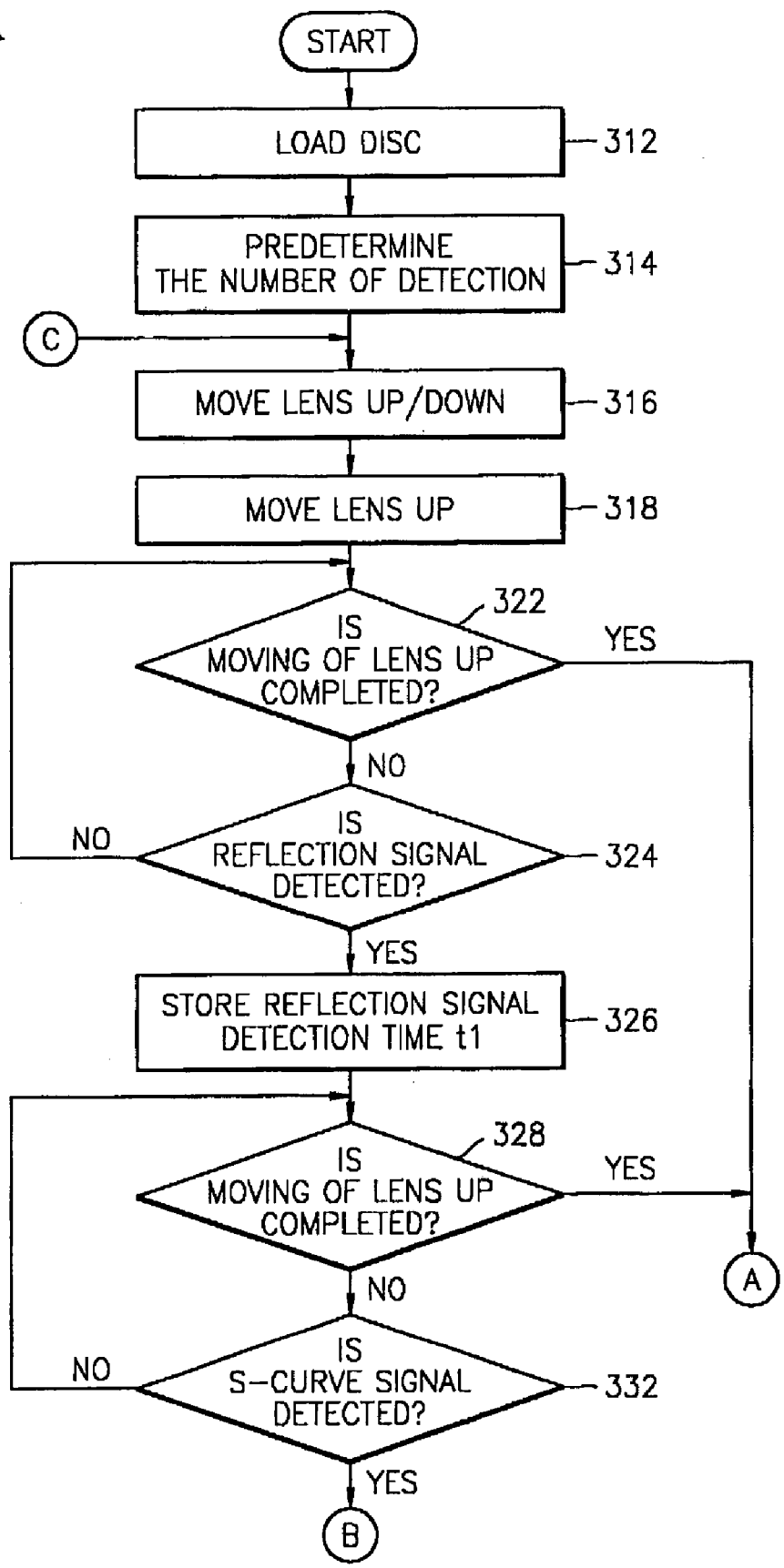
FIGS. 3A and 3B are flowcharts to determine a reference time to discriminate between different types of discs, according to an aspect of the present invention.
Figure 3B:
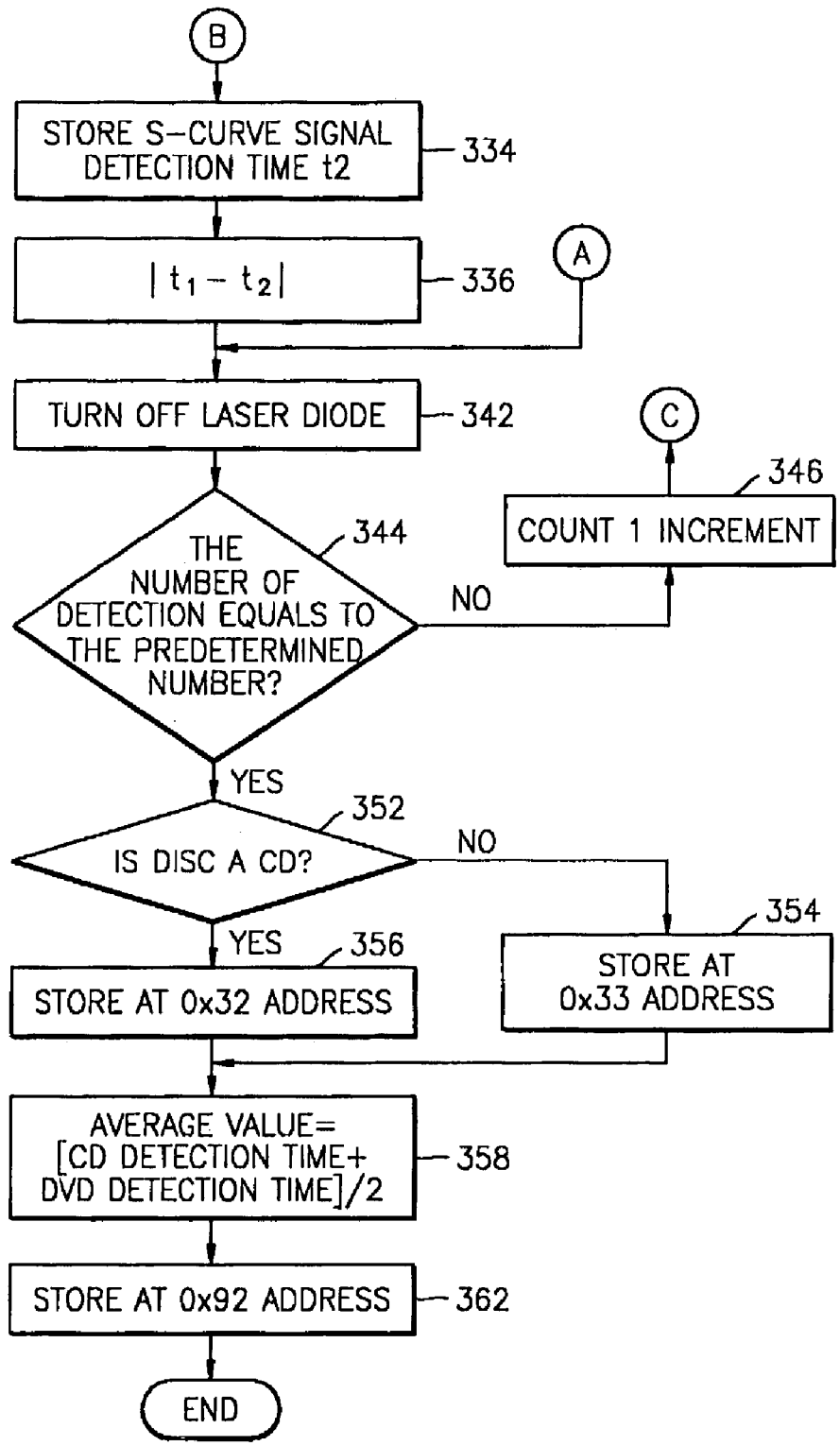

FIGS. 3A and 3B are flowcharts for determining a reference time to discriminate between different types of discs, according to an aspect of the present invention. First the CD and then the DVD are loaded into the optical disc system. It is noted that addresses for storing information of measurements of the CD and DVD are predetermined before loading the discs.

At operation 312, a first disc, i.e., the CD, is loaded into the optical disc system. Then, at operation 314, a detection number is determined. Then, at operation 316, a laser diode is turned on, and the lens is moved down for a predetermined time. Then, at operation 318, the lens is moved up for a predetermined time. After checking if the moving up of the lens is complete, if the moving up of the lens is complete, at operation 322, the laser diode is turned off. However, if the moving up of the lens is not yet complete, at operation 324, it is examined whether a reflection signal is detected. If the reflection signal is not yet detected, at operation 322, the moving up of the lens is checked again. If the reflection signal is detected, at operation 326, the reflection signal detection time is stored. Thereafter, at operation 328, the moving up of the lens is checked again. If the moving up of the lens is complete, the laser diode is turned off. However, if the moving up of the lens is not yet complete, at operation 332, it is examined whether an S-curve signal is detected. If the S-curve signal is not detected, at operation 328, the moving up of the lens is checked again. On the other hand, at operation 334 if the S-curve signal is detected, the S-curve signal detection time is stored. At operation 336, a disc detection time as a time difference between the reflection signal detection time and the S-curve signal detection time is calculated and stored.

That is, the disc detection time is calculated according to the following equation:

$$t_d = |t_1 - t_2| \qquad (1)$$

where $t_d$ is the disc detection time, $t_1$ is the reflection signal detection time, and $t_2$ is the S-curve signal detection time. Then, at operation 342 the laser diode is turned off. Then, it is examined whether the detection number equals to the predetermined number of detection. If the detection number does not equal to the predetermined number of disc detection, at operation 346, a count is increased by 1 and the above operations starting from operation 316 are performed again. However, if the number of detection equals to the predetermined number of disc detection, at operation 352, the type of the disc loaded at present is determined. The determination of the type of disc presently loaded is performed using the address where the information on the present disc is stored.

The disc detection times measured for the CD and the DVD, respectively, are stored in the memory. If the present disc is the CD, at operation 356, the disc detection time measured for the CD is stored at an address of 0x32 of the memory, and if it is the DVD, at operation 354, the measured disc detection time is stored at an address of 0x33 of the memory. Thereafter, at operation 358, an average value of the disc detection times measured for the CD and the DVD is calculated. The average value is calculated using the following equation:

$$\text{average value} = (CD \text{ detection time} + DVD \text{ detection time})/2 \quad (2)$$

Here, the detection time is time differences between $t_1$ and $t_2$.

At operation 362, the calculated average is stored in the memory, e.g., at an address of 0x92 of EEPROM.

In the same environment, i.e., in the same optical system with a condition of the pickup being the same, the CD detection time is generally double the DVD detection time because the distance between the surface area and the recording area of the DVD, i.e., 0.6 mm, is a half of that of the CD, i.e., 1.2 mm. Therefore, after obtaining the disc detection times for the CD and the DVD and storing the average of the disc detection times, the stored average disc detection time is used as a reference time for discriminating between CDs and DVDs when discs are inserted into the optical disc system. That is, if the disc detection time is above the stored average disc detection time, the disc is identified as the CD, and if the disc detection time is below the stored average disc detection time, the disc is identified as the DVD. The average disc detection time can be measured and stored during the process of manufacturing an optical disc system, and the stored value can be used as a reference value.

As described above, according to an aspect of the present invention, a reference for discriminating between a CD and a DVD is determined regardless of a difference in DC sensitivity of a pickup and a non-linearity characteristic of an actuator. Further, because an average of disc detection times for the CD and the DVD is used as a reference time, a time difference between a disc detection time and the reference time can be known, and accordingly, a pickup can be more adequately designed in consideration of a tolerance of the disc detection times.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disc discrimination method, comprising:
    loading a first disc into an optical disc system and calculating a first time difference between a time when a first focusing signal is detected from a first recording area of the first disc and a time when a first reflection signal is detected from a first surface area of the first disc;
    loading a second disc into the optical disc system and calculating a second time difference between a time when a second focusing signal is detected from a second recording area of the second disc and a time when a second reflection signal is detected from a second surface area of the second disc;
    calculating an average value of the first and the second time differences;
    determining the average value obtained as a reference time; and
    identifying a disc type of the first disc or the second disc loaded into the optical disc system using the average value.

2. The disc discrimination method according to claim 1, wherein the time differences are differences between times when S-curve signals and the first and second reflection signals are detected by moving a lens down and up for a constant time.

3. The disc discrimination method according to claim 1, wherein the first disc is a compact disc (CD), and the second disc is a digital versatile disc (DVD).

4. The disc discrimination method according to claim 1, further comprising:
    identifying the disc type, wherein if the average value is above a predetermined value, the disc type is a compact disc, and if the average value is below the predetermined value, the disc type is a digital video disc.

5. The disc discrimination method according to claim 1, further comprising:
    moving a lens down for a first predetermined time;
    moving the lens up for a second predetermined time;
    turning off the laser diode when the moving up of the lens is complete; and
    detecting the first and second reflection signals if the moving up of the lens is not complete, wherein if the first and second reflection signals are not detected, the moving up of the lens is checked again.

6. The disc discrimination method according to claim 1, further comprising:
    detecting first and second S-curve signals if the moving up of the lens is not yet complete, wherein if the S-curve signal is not detected, the moving up of the lens is checked again;
    storing first and second S-curve signal detection times associated with the first and second S-curve signals, respectively; and
    calculating and storing a disc detection time as a time difference between the first and second reflection signal detection time and the first and second S-curve signal detection times, respectively.

7. The disc discrimination method according to claim 6, wherein the average value of the first and the second time differences is calculated using the following equation:

$$\text{average value} = (\text{first disc detection time} + \text{second disc detection time})/2$$

wherein, the first disc detection time is a time difference between the first reflection signal detection time and the first S-curve signal detection time and the second disc detection time is a time difference between the second reflection signal detection time and the second S-curve signal detection time.

8. A disc discrimination apparatus having a lens and a pickup, the apparatus comprising:
    an RF amplifier generating a reflection signal and a focusing signal in response to up and down motions of the lens of the pickup; and
    a system controller measuring times when the reflection signal and the focusing signal are detected with respect to different types of discs, calculating an average value of time differences between reflection signal detection times and focusing signal detection times measured with respect to the different types of discs, and determining the average value as a reference time to discriminate between the different types of discs.

9. A disc discrimination apparatus in a recording mode to determine a type of disc, comprising:
    a system controller outputting a lens up/down instruction;
    a pickup;

a digital signal processor (DSP) adding an error correction code (ECC) to encoded audio/video data and, in response to the lens up/down instruction from the system controller, providing a lens driving signal to the pickup;

an RF amplifier converting an electrical signal from the DSP into an optical signal to be recorded onto the disc; and a servo receiving information from the DSP through the RF amplifier and the system controller to perform servo operations, wherein the system controller generates a reference time to discriminate between different types of discs based on a reflection signal detection time and an S-curve signal detection time.

10. The disc discrimination apparatus according to claim 9, further comprising:

a memory storing the reflection signal detection time and the S-curve signal detection time calculated by the system controller.

11. A disc discrimination apparatus in a reproduction mode to determine a type of disc, comprising:

a system controller outputting a lens up/down instruction;

a pickup reading an optical signal from the disc on which data is recorded;

an RF amplifier converting an optical signal from the DSP into an electrical signal, extracting servo signals and modulation data to perform servo operations, and detecting a reflection signal and an S-curve signal from the optical signal;

a digital signal processor (DSP) demodulating the modulation data extracted through the RF amplifier, performing error correction while removing additive data, and providing a lens driving signal to the pickup in response to the lens up/down instruction from the system controller; and a servo receiving information from the DSP through the RF amplifier and the system controller to perform servo operations, wherein the system controller generates a reference time to discriminate between different types of discs based on a reflection signal detection time and an S-curve signal detection time.

12. The disc discrimination apparatus according to claim 11, further comprising:

a memory storing the reflection signal detection time and the S-curve signal detection time calculated by the system controller.

* * * * *